United States Patent [19]

Rees et al.

[11] Patent Number: 4,998,234

[45] Date of Patent: Mar. 5, 1991

[54] LOGARITHMIC SERVO ERROR DETECTION FOR OPTICAL DISK DRIVE

[76] Inventors: Theodore D. Rees, 2296 Sun-Mar Ave., Mountain View, Calif. 94040; Ian Turner, 674 Vanderbilt Dr., Sunnyvale, Calif. 94087; William L. Harvey, 149 Fairchild Dr., Mountain View, Calif. 94043

[21] Appl. No.: 412,633

[22] Filed: Sep. 25, 1989

Related U.S. Application Data

[63] Continuation of Ser. No. 33,303, Mar. 31, 1987, abandoned.

[51] Int. Cl.$^5$ ............................................. G11B 7/00
[52] U.S. Cl. .............................. 369/44.27; 369/44.41; 369/124
[58] Field of Search ................... 369/44-46, 369/124

[56] References Cited

U.S. PATENT DOCUMENTS

| | | | |
|---|---|---|---|
| 4,532,522 | 7/1985 | Tsunoda | 369/109 |
| 4,547,872 | 10/1985 | Henmi | 369/54 |
| 4,556,965 | 12/1985 | Tsunoda | 369/46 |
| 4,559,622 | 12/1985 | Hazel | 369/46 |
| 4,570,251 | 2/1986 | Yokota | 369/58 |
| 4,589,103 | 5/1986 | Tajima | 369/46 |
| 4,707,648 | 11/1987 | Minami | 369/45 |

Primary Examiner—Aristotelis M. Psitos
Assistant Examiner—James E. Tomassini
Attorney, Agent, or Firm—Steven F. Caserza

[57] ABSTRACT

An improved focus and tracking error detection circuit for an optical disk servo system. The circuit calculates the logarithm of the signal from each of at least a pair of photodetectors. The difference between two logarithmic signals is then determined to give an error signal. The invention takes advantage of the property of logarithms that the difference between two logarithmic signals is equivalent to the logarithm of the ratio of the two signals. Accordingly, the error signal is a ratio, rather than an absolute difference signal, and is thus insensitive to variations which affect both signals. In addition, the logarithmic circuits inherently minimize variations which affect the photodetectors unequally by performing an AGC-type function. The error signal is inhibited during a write pulse to the laser to prevent saturation of the amplifiers. An automatic, periodic offset adjustment is provided by turning off the laser and varying an offset voltage until the error signal is zero. Peak detectors are used to eliminate the effects of data signals.

29 Claims, 9 Drawing Sheets

OUT OF FOCUS
IN FOCUS     TOO NEAR     TOO FAR
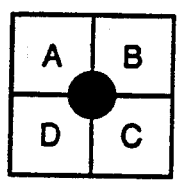 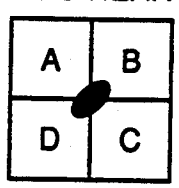 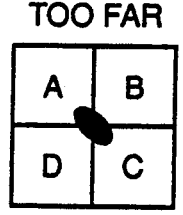
ASTIGMATIC FOCUS DETECTION = (A+C) − (B+D)
FIGURE 2A     FIGURE 2B     FIGURE 2C
ON TRACK     OFF TRACK LEFT     OFF TRACK RIGHT
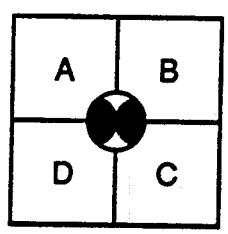 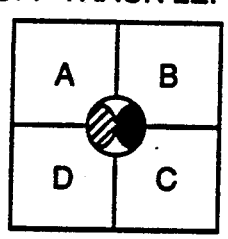 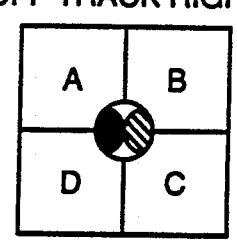
INTERFERENCE TRACK DETECTION (A+0) − (B+C)
FIGURE 3A     FIGURE 3B     FIGURE 3C $$A_V = \frac{1}{\text{LOG (OFFSET} + e_{IN})}$$

$$E_{OUT} = \frac{e_{IN}}{\text{LOG (OFFSET} + e_{IN})}$$

$$E_{OUT} = \frac{e_{IN}}{\text{LOG (DO} + e_{IN})}$$

$$E_{OUT} = \frac{e_{IN}}{\text{LOG (OFFSET} + e_{IN})}$$

LOGARITHMIC SERVO ERROR DETECTION FOR OPTICAL DISK DRIVE

This is a continuation of application Ser. No. 07/033,303, filed Mar. 31, 1987, now abandoned.

BACKGROUND

The present invention relates to circuits for producing focus and tracking error signals to a servo system in an optical disk drive.

A typical optical disk system is shown in FIG. 1. An optical disk 12 which spins on a spindle 14 stores data which can be read and perhaps written with a laser beam. The data may be in the form of physical holes burned into a sensitive layer or layers on the disk substrate, or may be changes in the magnetic properties of the disk when exposed to the laser which cause a polarization of the reflected laser beam, or some other method. A laser diode 16 produces an elliptical, expanding laser beam which is converted into a parallel beam by a collimator 18. A beam-shaping prism 20 makes the elliptical beam circular, and the circular beam then passes through a beam-splitter 22, is reflected off a mirror 24 through a retardation plate 26 to an objective lens 28. Objective lens 28 focuses the beam on disk 12. A voice coil 30 serves to move objective lens 28 toward or away from disk 12 to keep it in focus. A second voice coil 31 can also move objective lens 28 sideways for tracking.

The reflected laser beam on the return path passes through objective lens 28, retardation plate 26, off mirror 24 and beam-splitter 22 to a second mirror 32 and a convergent lens 34 for focusing the reflected beam on a four-quadrant photodetector 36. A cylindrical lens 38 serves to produce an astigmatic image on photodetectors 36 when the beam is out of focus. The entire system from laser diode 16 through all of the lenses back to detector 36 is packaged as an optical head which is itself moved (or only the objective lens is moved) across disk 12 to track the data. This tracking is typically done by monitoring grooves which are stamped or molded into the surface of disk 12, with the data itself being either between the grooves or in the grooves themselves.

Photodetector 36 serves to detect data by monitoring variations in the intensity of the reflected laser beam. In addition, the use of four quadrants in photodetector 36 enables detection of focus errors and tracking errors. FIG. 2A shows the laser beam impinging equally on quadrants A, B, C and D of photodetector 36. Each of these quadrants is a separate photodetector producing a separate electrical signal. The sum of the outputs of the quadrants produces the read signal. When the beam is out of focus it will assume an elliptical shape as shown in the example of FIGS. 2B and 2C because the focal point is beyond or before the disk surface. In FIG. 2B, the distance between the objective lens and the disk is too small and in FIG. 2C the distance between the objective lens and the disk is too large (the opposite could be the case in a different system). Typically, a focus error signal is produced by calculating the difference between the light detected by quadrants A and C and the light detected by quadrants B and D. As can be seen, this value will be 0 for an in-focus condition, a negative value when the distance between the objective lens and the disk is too small and a positive value when the distance between the objective lens and the disk is too large.

A number of methods may be used for focus control. U. S. Pat. No. 4,556,965 to Tsunoda, et al., discusses a prior art method of using an air jet nozzle to keep an optical head a constant distance off of a disk.

U. S. Pat. No. 4,547,872 to Henmi, et al., produces a primary and two secondary laser beams with separate photodetectors. The amplified difference between the first and second secondary laser beams is used for focus control.

U. S. Pat. No. 4,532,522 to Tsunoda produces two additional light beams either both in front or both behind the primary light beam for tracking.

In U. S. Pat. No. 4,559,622 to Hazel, et al., the focus beam is split and sent to two photodetectors which are different distances from the optical disk. The beam will be parallel when the beam is in focus and the same amount of light will be on both photodetectors. A converging or diverging beam, indicating an out-of-focus condition, will result in different amounts of lights on the different photodetectors.

Finally, U. S. Pat. No. 4,556,965 to Tsunoda discusses the use of a four-quadrant photodetector such as that shown in FIG. 1. In this method, a single beam can be used for reading and for focus error detection.

FIGS. 3A-3C show the type of signal received in an interference track detection system. In such a system, if the light beam varies from the center of the track, the illumination on the left and right side of the photodetector will be different. One cause of the variation is the diffraction pattern generated by the grooves on the disk. Another cause of the variation is the light impinging upon a groove reflects back in all different directions and not just straight back to the photodetector. Yet another cause of variation is the inherent reflectivity difference of the area between the grooves and the area in the grooves. Accordingly, FIG. 3A shows an on-track condition, FIG. 3B shows the beam being off-track to the left such that quadrants A and D receive less light than quadrants B and C, and FIG. 3C shows the beam being off-track to the right. Accordingly, the tracking error signal is given by the difference between the light on the A and D quadrants and the light on the B and C quadrants.

Since the error signals produced are difference signals, they must be calibrated to the intensity of the laser beam and the reflectivity of the media which can cause equal variations in intensity across all four photodetectors. In addition, there can be unequal variations in intensity. The laser beam wavefront can have distortions or aberrations (which may vary with intensity), resulting in an uneven distribution across the four photodetectors, and data may cause unequal changes. If the modulation of light due to the detection of data is not even on all four quadrants, false errors may again be detected. These variations may differ with intensity as well. Also, the laser beam is typically not exactly centered on the quad photocell due to optical and mechanical tolerances. Unless these various offsets are compensated for, the size of the error signal generated will be larger or smaller than appropriate. This will affect the servo system offset and response (over or under correction) and may result in instability.

Changes in the intensity of the beam also occur during a write signal for an optical head which is capable of writing as well as reading. In one method of writing, a disk substrate which is only 4% reflective is covered with a sensitive coating which is 40% reflective. Writing is accomplished with a high intensity laser beam which burns a hole through the sensitive coating. This hole then shows up as a dark spot during a read operation since the nonreflective substrate is exposed. Typically, during a write pulse, the laser power increases from 1 milliwatt (mW) to above 5 mW. A write pulse thus gives at least a five times increase in intensity.

In addition to actual changes in the intensity, shape or position of the laser beam, apparent changes can result due to temperature drift of the photodetectors or other causes.

Typical methods for dealing with these variations are factory-set offsets and using an analog divider which divides the error signal by a signal which is a sum of the signals received from all of the photodetectors. Thus, changes in the intensity or changes due to temperature drift which give an apparent intensity change are compensated for since these terms appear in both the numerator and denominator of the ratio produced by the analog divider. The disadvantage of this method is the requirement for additional circuitry and the additional expense of a good analog divider. In addition, the analog divider does not compensate for unequal variations among the photodetectors.

The use of the same photodetectors for the error signal and the read signal presents additional problems. Unless the data is filtered, it may introduce uneven variations in the error signal. The filtering out of the data signal cannot be done until after an initial amplification, otherwise the data signal would be lost. Such systems require a wideband amplifier to preserve the data signal. Other systems use a simpler, narrowband amplifier, thus eliminating the cost and complexity of a wideband amplifier, by using a separate photocell for producing the data signal. An alternate method is to use a separate amplifier coupled across a resistor connected to the cathodes of the photodiodes to produce a separate data signal. The anodes of the photodiodes produce the signal used for error detection, which can thus use a simple amplifier.

There is always a need for improved optical disk servo systems which reduce complexity and cost and/or improve sensitivity.

SUMMARY OF THE INVENTION

The present invention is directed to an improved focus and tracking error detection circuit for an optical disk servo system. The circuit calculates the logarithm of the signal from each of at least a pair of photodetectors. The difference between two logarithmic signals is then determined to give an error signal. The invention takes advantage of the property of logarithms that the difference between two logarithmic signals is equal to the logarithm of the ratio of the two signals.

Accordingly, the error signal is a ratio, rather than an absolute difference signal, and is thus insensitive to variations which affect both signals. Although the analog dividers of the prior art also produce a ratio signal, logarithmic circuits are cheaper and easier to implement. In addition, the logarithmic circuits inherently minimize variations which affect the photodetectors unequally by performing an automatic gain control (AGC)-type function. A logarithmic circuit amplifies signals smaller than the reference level (the in focus, on track value) less than signals larger than the reference level, thus minimizing variations from the reference level in both directions.

The present invention also provides a peak detection circuit which ignores negative-going signals due to data. The signal level is held at the value in between data bits. Thus, the error signal is not affected by the different reflectivity of the data region or other variations which are affected by a change in intensity.

The present invention also disables the error signal circuitry during a write pulse, rather than relying on the ratio measurement to cancel the effects of the write pulse. This enables the error signal circuitry to be more sensitive without the danger of saturation during a write pulse. In addition, since the data created during writing will affect the reflected write pulse, the variations due to data are avoided.

The amplifiers in the error detection circuit of the present invention are provided with an automatic, periodic offset adjustment. During initial calibration and periodically thereafter the laser beam is shut off for an instant and the signal output of the photodetectors is measured. The offsets provided to the amplifiers are varied until the measured signal is zero. This circuit thus compensates for temperature drifts and other effects which vary the output of the photodetectors independent of the intensity of the light detected.

The system of the present invention thus automatically compensates for changes in the reflectivity of the optical disk which affect all photodetectors, changes in the intensity of the laser beam itself and changes in the photodetector signals due to temperature drifts or other effects. In addition, variations between photodetectors are minimized. The circuit of the present invention can be used in any detection system where more than one photodetector is used.

In the preferred embodiment, a four-quadrant photodetector is used. The signal from each quadrant photodetector is supplied to a separate channel where it is first amplified by a wideband amplifier which is provided with a DC offset from a digital-to-analog (D/A) converter under the control of a microprocessor. During an offset adjustment, the laser beam is turned off and the microprocessor tries various offsets. The microprocessor monitors the output of zero-crossing comparators which compare signals from each channel to zero. When the comparator's output changes state, indicating a zero crossing, the offset value is fixed.

The signal from each amplifier is further processed in each channel with another amplifier and a peak detection circuit. The peak detection circuit holds its output at the latest value before any negative-going data signal, thereby eliminating the effects of variations in intensity, shape or otherwise of the detected laser beam due to data.

The circuitry at the peak detection circuit and beyond is inhibited during a write pulse. This does not adversely effect the performance of the tracking and focus error signal generation since the write pulses are brief in duration.

The signal from each channel is then applied to a logarithmic amplifier. In one embodiment, each log amplifier uses an operational amplifier with two diodes, rather than one, to increase the dynamic range of the logarithmic amplifier. These log signals are then summed to produce a reference signal, and then variations from the average of the photodetector outputs (the reference signal) are measured. This results in a much smaller signal being processed than if the entire value of each photodetector output were processed. This increases the sensitivity of the system.

A sum and difference circuit then produces the logarithmic ratios for the focus and tracking errors. The outputs of the sum and difference circuit are applied to focus and tracking drivers for moving the objective lens in the optical head.

For a fuller understanding of the nature and advantages of the invention, reference should be made to the ensuing detailed description taken in conjunction with the accompanying drawings.

BRIEF DESCRIPTION OF THE DRAWINGS

FIGS. 2A-2C are schematic diagrams of the in-and out-of-focus conditions of the laser beam on a four-quadrant photodetector;

FIGS. 3A-3C are schematic diagrams of the on-and off-track positions of a laser beam on a four-quadrant photodetector;

DETAILED DESCRIPTION OF THE PREFERRED EMBODIMENTS

Figure 1:
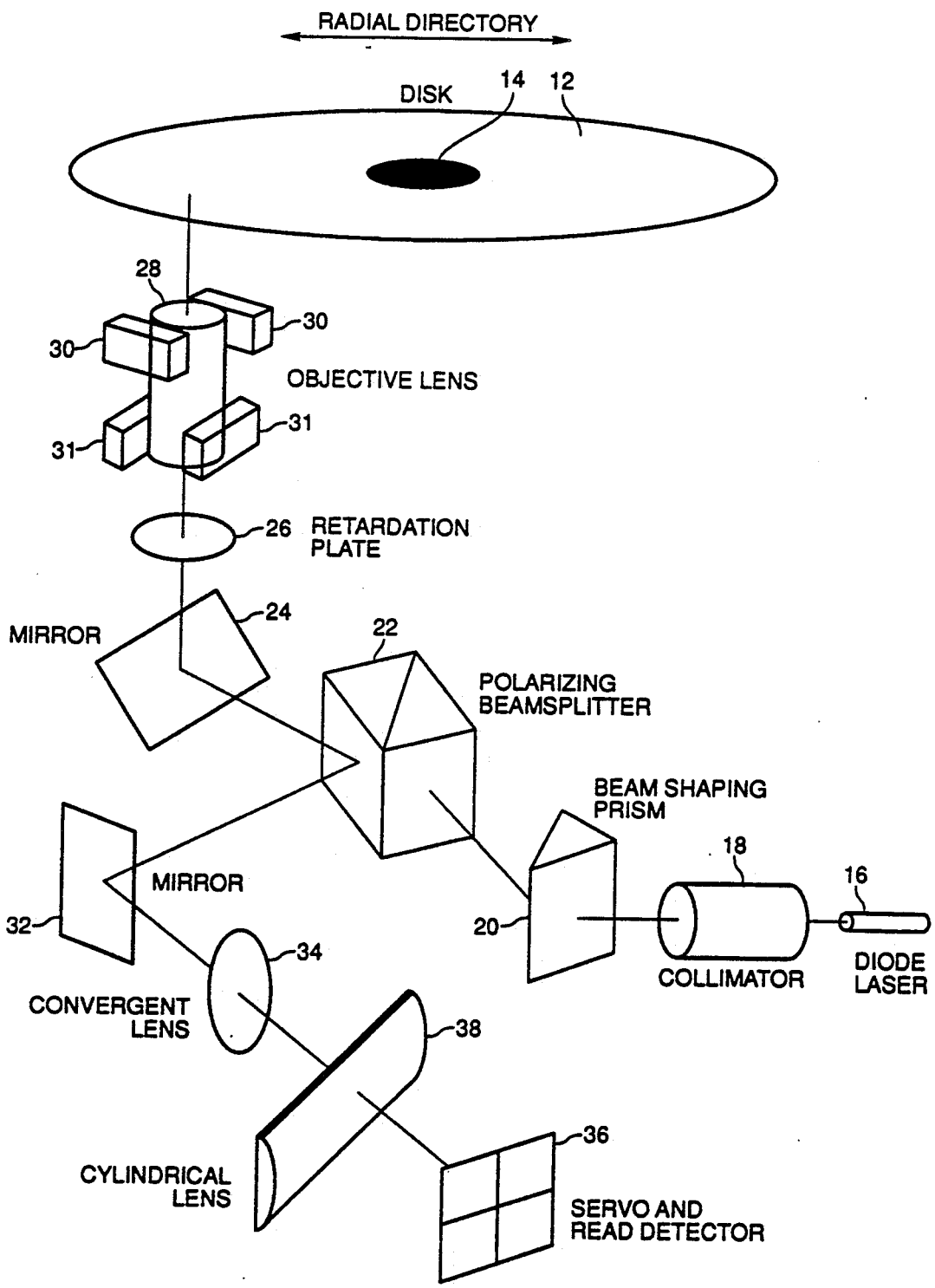
FIG. 1 is a block diagram of a typical prior art optical head assembly.
Figure 4:
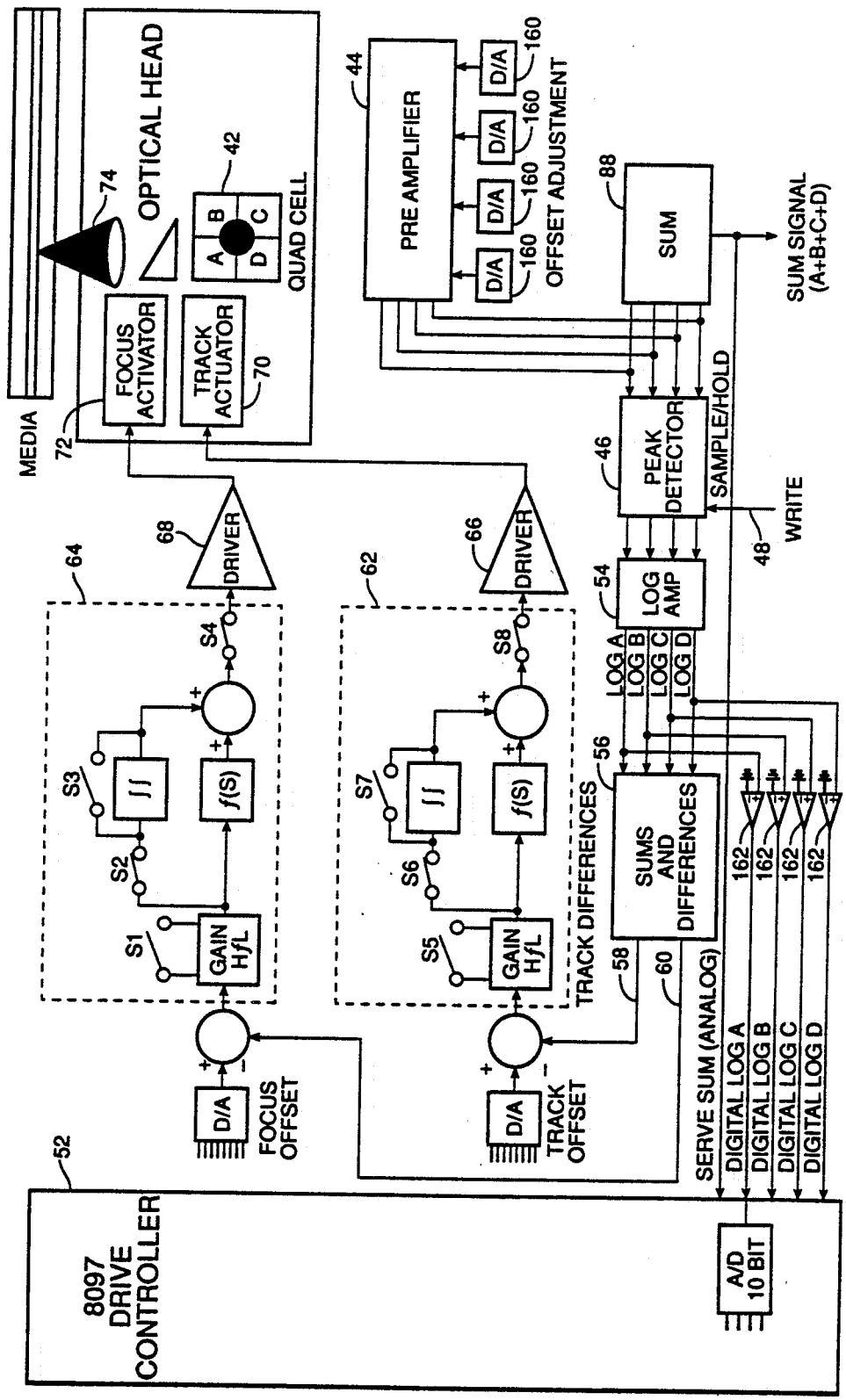
FIG. 4 is a block diagram of a servo control circuit according to the present invention.

FIG. 4 is a block diagram of an optical head servo system according to the present invention. An optical head 40 contains a four-quadrant photodetector 42 for detecting a reflected laser beam. Signals from photodetector 42 are provided to amplifiers 44 and then to a gated peak detector 46. These signals are also provided to a summation circuit 88 which provides a read signal for detecting the data. Gated peak detector 46 gates out the high frequency data pulses from amplifiers 44, so that the signal level in between these pulses is maintained at the output of peak detectors 46. A write timing signal 48 inhibits the operation of gated peak detector 46 during a high intensity write pulse.

Logarithmic amplifiers 54 calculate the logarithm of each signal and provides it to a sum and difference circuit 56. Sum and difference circuit 56 provides a track error signal on line 58 which is the logarithm of AD/BC. A focus error signal is produced on line 60 which is log AC/BD. These signals are then provided to track loop control compensation circuitry 62 and focus loop control compensation circuitry 64, respectively. An offset signal is provided to each of these circuits from a controller 52. The outputs of circuits 62 and 64 are provided to drivers 66 and 68, respectively. The drivers control tracking actuator 70 and focus actuator 72 which move objective lens 74 in optical head 40 to keep the objective lens on track and in focus.

Offset adjustments are provided to amplifiers 44 through D/A converters 160. The digital inputs to these D/A converters are provided from controller 52. The values of the offsets are adjusted by turning the laser off for a short period of time during calibration and periodically during operation of the optical disk drive. With the laser beam off, controller 52 monitors the outputs of comparators 162. Comparators 162 compare the output of the four signals from log amplifiers 54 to a ground reference. Controller 52 varies the offsets provided to amplifier 44 until a zero crossing is detected on the corresponding comparator 162, indicating a zero level signal. The offset is then fixed at that value.

Figure 5:
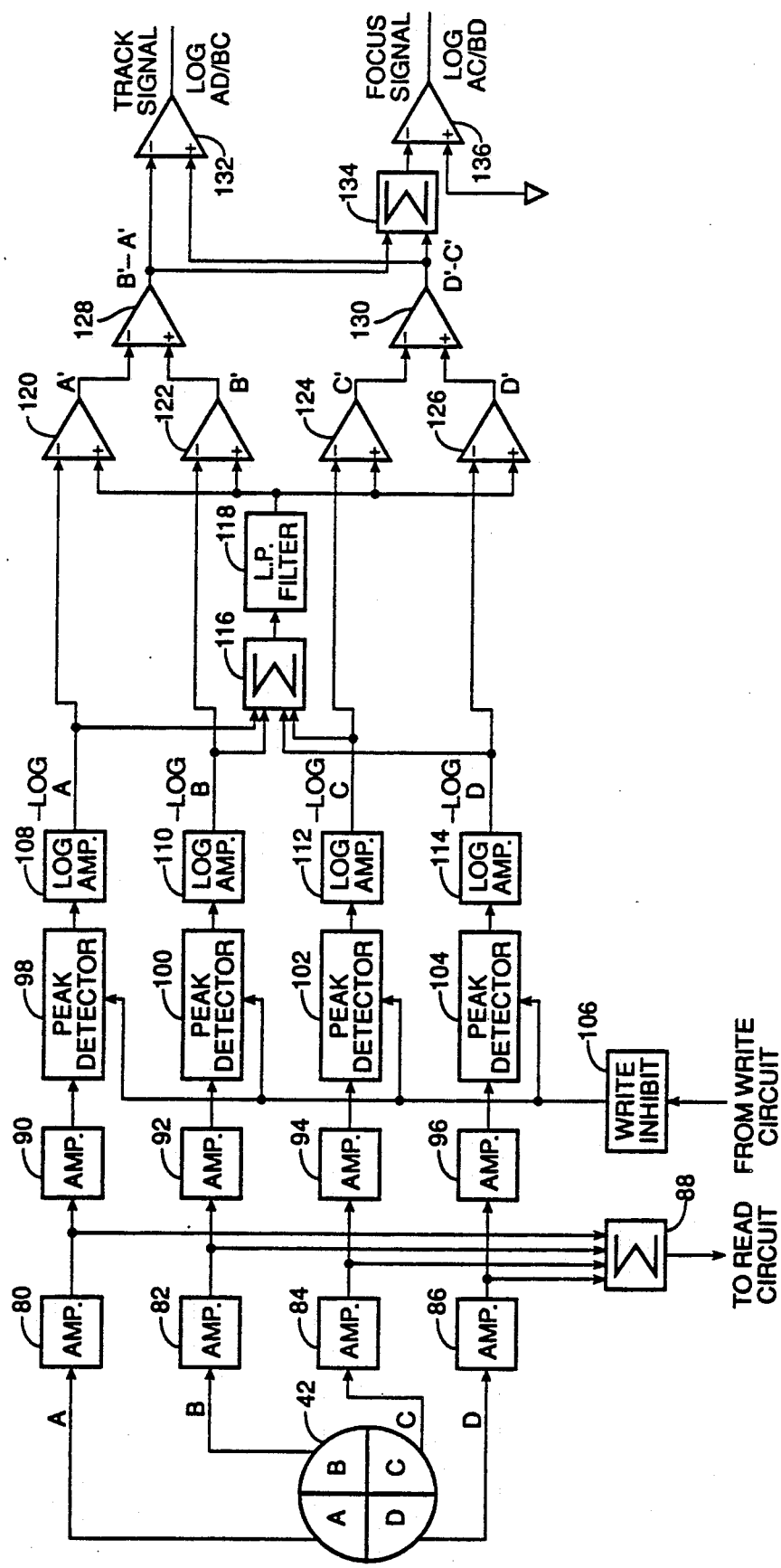
FIG. 5 is a block diagram showing the logarithm and sum and difference circuits of FIG. 4 in more detail.

FIG. 5 shows portions of the circuitry of FIG. 4 in more detail. Four-quadrant photodetector 42 provides A, B, C and D signals from each of the quadrants to DC-coupled amplifiers 80, 82, 84 and 86. Amplifiers are needed because the current from each photodetector diode of photodetector 42 is typically 10–20 microamps. The amplifiers are DC-coupled because they have to recover the DC servo signal. A wideband amplifier is used so that the data signal will not be filtered out. The output of each of amplifiers 80–86 is provided to a summing circuit 88 which produces a read signal for the optical head read circuit (not shown). The use of these amplifiers eliminates the need for separate read amplifiers in the read circuit.

A second set of amplifiers 90, 92, 94 and 96 are used to further amplify the signal. This is necessary because the peak detectors need a signal of at least one volt.

Peak detection circuits 98, 100, 102 and 104 provide an output having a level equivalent to the level of the detected signal in between data peaks. The negative data pulses are ignored by the peak detection circuit. In addition, a write inhibit circuit 106 provides an inhibit signal to each of the peak detect circuits during a write pulse. This is necessary because the peak detect circuits gate out a negative going data pulse, but will respond quickly to a positive write pulse which appears to the detect circuit as simply an increase in the average level. Thus, the peak detect circuits are disabled during a write pulse to prevent saturated signals from influencing the output.

Four logarithm circuits 108, 110, 112 and 114 produce a signal which is the logarithm of the amplitude of the signal from photodetectors A, B, C and D, respectively. These signals are summed together in a summation circuit 116 and passed through a low-pass filter 118 to give a reference signal which is log ABCD. Low pass filter 118 is provided to match the frequency response of the reference signal to the frequency response of the individual log signals in subtracting amplifiers 120, 122, 124 and 126.

Each of the log signals is subtracted from the reference signal in amplifiers 120, 122, 124 and 126. Thus, each log signal is referenced to an average of the log signals rather than being referenced to zero. All of the log signals are close to the same DC offset and do not vary by very much from that offset. Accordingly, by removing the DC offset and referencing the signals to that DC offset, the variations are proportionately larger, thus improving sensitivity.

The result of the comparison to the reference level gives a number of product logs as follows:

$A' = -\log BCD;$
$B' = -\log ACD;$
$C' = -\log ABD;$ and
$D' = -\log ABC.$

An amplifier 128 gives the signal $A'-B'$ and an amplifier 130 gives the signal $D'-C'$. These signals are then combined in an amplifier 132 to give a signal which is log (AC/BD). This signal is the tracking error signal and is the log of the ratio of the two sectors of interest as shown in FIGS. 2A-2C.

The outputs of amplifiers 128 and 130 are summed in a summation circuit 134 and subtracted from zero in an amplifier 136 to produce a signal which is log (AD/BC). This is the focus error signal which is supplied to the focus analog circuitry 64 of FIG. 4.

The signals are derived as follows:

The inputs to log amplifiers 108-112 are A, B, C and D. The outputs of the log amplifiers are $-\log A$, $-\log B$, $-\log C$ and $-\log D$.

The output of summation circuit 116 is:

$$-[\text{Log } A + \text{Log } B + \text{Log } C + \text{Log } D] = -\text{Log } ABCD$$

Subtracting $-\text{Log } A$ from this value in amplifier 120 gives $$-\text{Log } ABCD - (-\text{Log } A) = -\text{Log } \frac{ABCD}{A} = -\text{Log } BCD = A'$$

The outputs of amplifiers 122, 124, and 126 are similarly derived to give $-\text{Log ACD} = B'$, $-\text{Log ABD} = C'$ and $-\text{Log ABC} = D'$, respectively.

The output of amplifier 128 is:

$$B' - A' = -\text{Log } ACD - (-\text{Log } BCD)$$

The output of amplifier 130 is:

$$D' - C' = -\text{Log } ABC - (-\text{Log } ABD)$$

Subtracting the amplifier 128 output from the comparator 130 output in amplifier 132 gives:

$$(D' - C') - (B' - A') = D' + A' - (B' + C') =$$

$$-\text{Log } ABC - \text{Log } BCD + \text{Log } ACD + \text{Log } ABD =$$

$$\text{Log } \frac{ACD * ABD}{ABC * BCD} = \text{Log } \frac{AD}{BC}$$

This is the tracking error signal.

To get the focus error signal, the outputs of amplifiers 128 and 130 are summed in summation circuit 134 to give:

$$(B' - A') + (D' - C')$$

Subtracting the output of summation circuit 134 from zero in amplifier 136 gives:

$$-(B' - A' + D' - C') = A' - B' - D' + C' =$$

$$-\text{Log } BCD + \text{Log } ACD + \text{Log } ABC - \text{Log } ABD =$$

$$\text{Log } \frac{ACD * ABC}{BCD * ABD} = \text{Log } \frac{AC}{BD}$$

This is the focus error signal.

Figure 6:
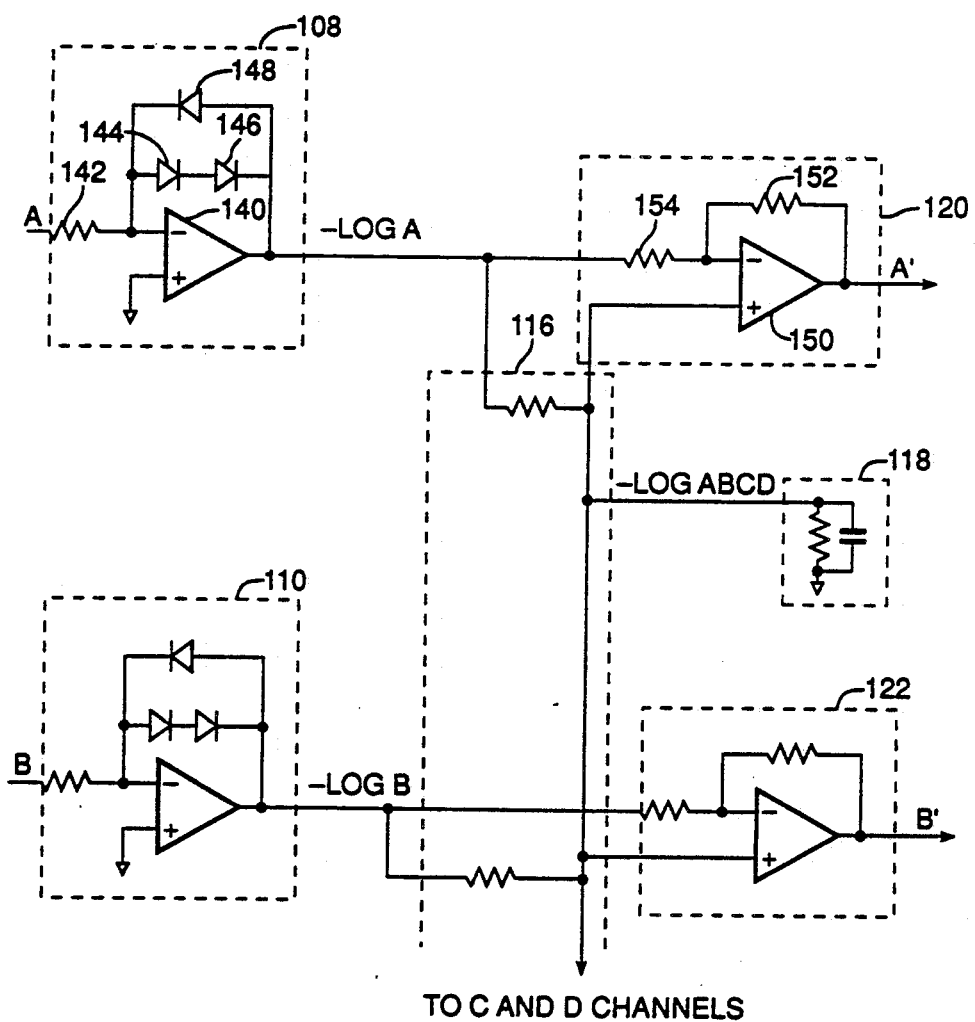
FIG. 6 is a schematic diagram of a logarithm circuit and a sum and difference circuit of FIG. 5.

FIG. 6 shows a portion of the blocks of FIG. 5 in more detail. Logarithm circuit 108 uses an amplifier 140 with a positive input grounded and a negative input coupled through a resistor 142 to the output of peak detector 98. The negative input of amplifier 140 is coupled to its output through a pair of diodes 144 and 146 which provide the logarithmic function. A reverse clamping diode 148 is provided to speed up the response to negative inputs by preventing large negative excursions. The $-\log A$ output of amplifier 140 is provided to the negative input of a amplifier circuit 120 having an amplifier 150 and a pair of resistors 152, 154. The $-\log A$ output of amplifier 140 is also combined through a resistor 156 with the $-\log B$, $-\log C$ and $-\log D$ outputs from similar resistors in summation circuit 116 to provide the positive input to amplifier 150. The remaining channels are constructed similarly.

The use of two diodes 144 and 146 increases the dynamic range of the logarithm produced, thus giving an amplifying effect.

FIG. 8A-8I illustrate the advantages of the logarithmic error detection according to the present invention.

Figure 8A:
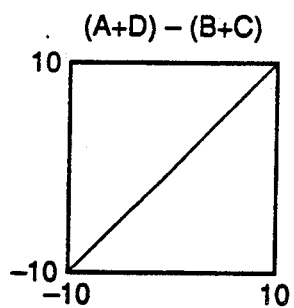
FIG. 8A-8I are various graphs illustrating the advantages of logarithmic error detection.

FIG. 8A shows a typical prior art tracking difference curve of $(A+D)-(B+C)$ versus the distance of the reflected laser beam from the center of the four quadrant photodetector. As can be seen, this is a linear function.

Figure 8B:
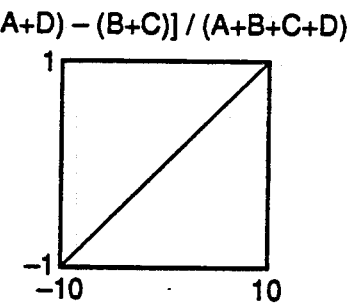

FIG. 8B shows a typical prior art normalized tracking difference curve of $$\frac{(A + D) - (B + C)}{(A + B + C + D)}.$$

The difference signal is smaller because only variations from the average are measured, but the function is still linear.

Figure 8C:
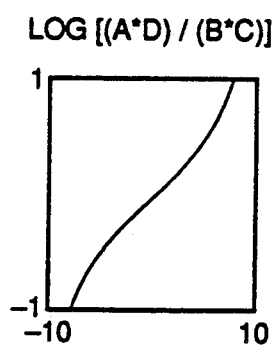

FIG. 8C shows the log ratio tracking difference curve of $$\log \frac{(A*D)}{(B*C)}$$

according to the present invention. As can be seen, this is a non-linear function.

Figure 8D:
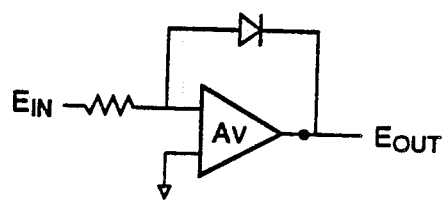

Referring to FIG. 8D, the output of the logarithmic amplifier (EOUT) is the product of the input signal from the quad detector (EIN) times the logarithmic amplifier gain (AV), therefore, $$EOUT = EIN * AV.$$

Figure 8E:
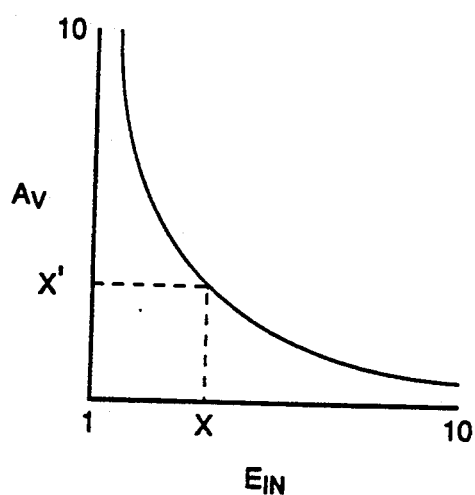

The log gain of the amplifier is inversely proportional to the amplitude of the input signal; i.e., the larger the input signal, the lower the amplifier gain, and vice-versa (hence the 1/log function of FIG. 8E).

The log amplifier is biased up on the curve to an operating point that gives a reasonably linear change in amplifier gain (AV), in response to a similar change in input signal amplitude (EIN), to provide a constant output (EOUT) over a limited range about the operating point. Beyond this limited range, it can be seen that smaller values of EIN will be amplified more, thus minimizing the distance from the operating point. Similarly, larger values of EIN will be amplified less, also minimizing the distance from the operating point. Thus, the log circuit provides a signal normalization or AGC-type function.

Figure 8F:
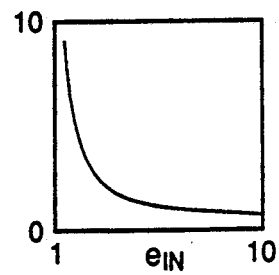

This operating point is indicated as "X" in FIG. 8E, and provides a corresponding gain of "X'". An amplifier gain curve (AV) similar to FIG. 8E but also including an offset is shown in FIG. 8F.

Figure 8G:
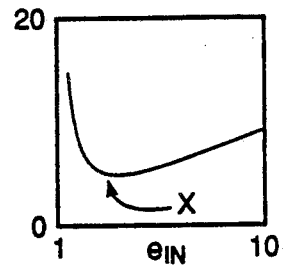

FIG. 8G shows a curve that represents EOUT, which is the product of EIN*AV. The operating point X is shown in FIG. 8G as well.

Figure 8H:
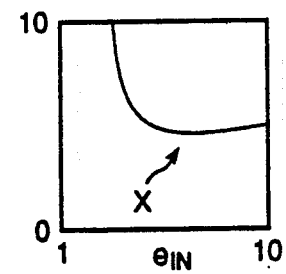
Figure 8I:
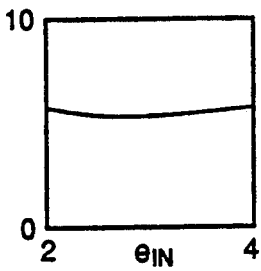

FIG. 8I represents an X-axis expansion of FIG. 8G to show that EOUT will be constant about operating point X for small variations of EIN. The linear range about the operating point is limited, but it can be increased by placing additional logarithmic elements (diodes, transistors) in the amplifier feedback circuit.

FIG. 8H shows that, by changing the operating point (DC offset), the linear range "X" can be shifted about EIN.

The log amplifier compensates for changes in the signal intensity due to changes in light level on the photodetector diodes, due to the fact that the DC operating point moves up or down the curve with these intensity changes, thus changing the overall gain of the amplifier to the input signal. This effect provides the equivalent of signal normalization, which was normally performed, in prior art circuitry, by analog division of the difference and sum (FIG. 8B).

The log ratio then provides the equivalent of the difference signal, which was normally derived, in prior art circuitry, by subtraction.

Unlike the prior art analog division technique, which is performed on the signal after differencing, the log compensation is performed on the signal from each individual quad cell before taking the ratio. This would be similar to using analog division on the signal from each individual quad cell. The advantage is the ability to correct errors at the quad cell level that are uncorrectible at the difference signal level.

Figure 7:
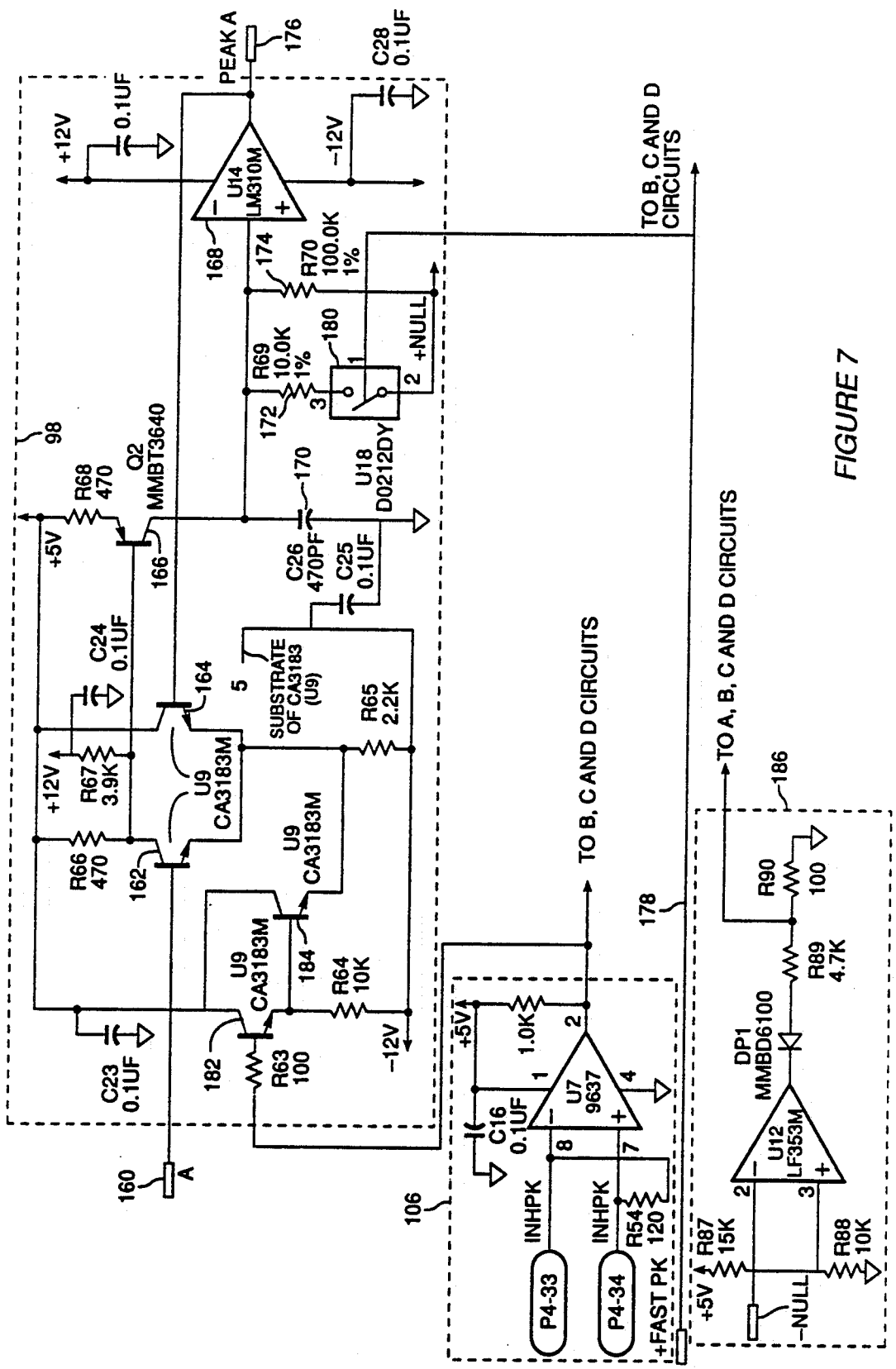
FIG. 7 is a schematic diagram of a peak detection circuit of FIG. 5.

FIG. 7 is a schematic diagram of peak detect circuit 98 of FIG. 5. An amplified signal A from amplifier 90 of FIG. 5 is provided on input line 160 to a first transistor of a differential transistor pair 162, 164. The collector of transistor 162 is coupled to the base of a current source transistor 166 which drives an input of a voltage follower operational amplifier 168. A capacitor 170 in conjunction with resistors 172 and 174 hold the voltage level at the input of amplifier 168 when there is a negative going peak which shuts off transistor 166. The output line 176 of amplifier 168 thus produces a voltage level which is uneffected by the negative going data peaks. Feedback from output line 176 is provided to the base of transistor 164 of the differential transistor pair.

A FASTPK signal on line 178 controls a switch 180 which serves to put resistor 172 in parallel with resistor 174. This signal is applied during a fast seek mode to widen the bandwidth of the peak detection circuit so that the circuit can follow faster frequency signals. Resistors 172 and 174 in combination with capacitor 170 determine the time constant of the decay of the signal at the input of amplifier 168 when a negative going data peak is gated out.

Write inhibit circuit 106 is FIG. 5 is also shown in FIG. 7. This circuit provides a signal to a pair of transistors 182, 184 which serve to turn off the differential pair of transistors 162 and 164 by raising the voltage at their emitters when a high signal is applied to the base of transistor 182. This prevents the output of peak A from changing in response to a high intensity write signal during a write pulse. Write inhibit circuit 106 produces a high voltage level when a write pulse is occurring to disable peak detection circuit 98 and any circuitry downstream which is coupled to output line 176. The output of write inhibit circuit 106 is similarly connected to peak detection circuits for the B, C and D channels which are identical to peak detection circuit 98 for channel A.

A null circuit 186 produces a voltage level to resistors 172 and 174. Null circuit 186 is used to pull the input of amplifier 168 low during an offset determination so that the output 176 will cross zero, enabling zero-crossing detectors 162 of FIG. 4 to detect a zero signal.

As will be understood by those familiar with the art, the present invention may be embodied in other specific forms without departing from the spirit or essential characteristics thereof. For example, the number of photodetectors could be varied and the specific way of obtaining the sum and differences of the logarithms could be varied as well. Accordingly, the disclosure of the preferred embodiment of the invention is intended to be illustrative, but not limiting, of the scope of the invention which is set forth in the following claims.

What is claimed is:

1. A method for determining an error signal from at least first and second detector signals from first and second photodetectors, respectively, in an optical detection system, and applying the error signal as feedback to an actuator in said optical detection system, comprising the steps of:
    (a) producing first and second log signals having amplitudes which have a logarithmic relationship to amplitudes of said first and second detector signals, respectively;
    (b) subtracting one of said log signals from the other of said log signals to produce a logarithmic error signal which is equivalent to the logarithm of the ratio of said first and second detector signals; and
    (c) providing said logarithmic error signal to said actuator in a manner which retains the logarithmic form of said logarithmic error signal.

2. A method for determining an error signal from at least first and second detector signals from first and second photodetectors, respectively, in an optical detection system, comprising the steps of:
    (a) producing first and second log signals having amplitudes which have a logarithmic relationship to amplitudes of said first and second detector signals, respectively;
    (b) subtracting one of said log signals from the other of said log signals to produce an error signal;
    (c) providing third and fourth detector signals from third and fourth photodetectors;
    (d) producing third and fourth log signals having amplitudes which have a logarithmic relationship to amplitudes of said third and fourth detector signals, respectively;
    (e) summing said first, second, third and fourth log signals to produce a log reference signal;
    (f) subtracting said first, second, third and fourth log signals from said log reference signal to produce first, second, third and fourth log multiple signals;
    (g) subtracting said first log multiple signal from said second log multiple signals to produce a first log difference signal; and
    (h) subtracting said third log multiple signal from said fourth log multiple signal to produce a second log difference signal;
    wherein said log signals of step (b) are said first and second log difference signals.

3. The method of claim 2 wherein said error signal is a tracking error signal and further comprising the steps of:
    summing said first and second log difference signals to produce a log sum signal; and
    subtracting said log sum signal from zero to produce a focus error signal.

4. The method of claim 1 further comprising the steps of:
    detecting a write pulse delivered to a laser in said optical detection system;
    producing a write inhibit pulse when said write pulse is detected; and
    preventing, responsive to said write inhibit pulse, said error signal from changing in response to said photodetector signal.

5. The method of claim 1 wherein said optical detection system includes a laser for reading data, and further comprising the steps of:
  periodically turning off said laser in said optical detection system;
  producing an error calibration signal;
  combining an ambient signal from a circuit coupled to an output of one of said photodetectors in the absence of light from said laser with said error calibration signal to produce a combined signal;
  choosing an initialization value for said error signal;
  comparing said combined signal with said initialization value; and
  varying said error calibration signal until said combined signal reaches said initialization value.

6. The method of claim 5 wherein said error calibration signal is an analog signal and further comprising the steps of:
  producing a digital error calibration signal; and
  converting said digital error calibration signal into analog form to produce said analog error calibration signal.

7. An apparatus for producing an error signal from at least first and second detector signals from first and second photodetectors, respectively, in an optical detection system using a reflected beam from a laser, and applying the error signal as feedback to an actuator for modifying the operation of the optical detection system, comprising:
  means for producing a first log signal having an amplitude which has a logarithmic relationship to an amplitude of said first detector signal;
  means for producing a second log signal having an amplitude which has a logarithmic relationship to an amplitude of said second detector signal;
  means for determining the difference between said log signals to produce a logarithmic error signal which is equivalent to the logarithm of the ratio of said first and second detector signals; and
  means for providing said logarithmic error signal to said actuator in a manner which retains the logarithmic form of the logarithmic error signal.

8. An apparatus for producing an error signal from at least first and second detector signals from first and second photodetectors, respectively, in an optical detection system using a reflected beam from a laser, comprising:
  means for producing a first log signal having an amplitude which has a logarithmic relationship to an amplitude of said first detector signal;
  means for producing a second log signal having an amplitude which has a logarithmic relationship to an amplitude of said second detector signal;
  means for determining the difference between said log signals to produce an error signal;
  third and fourth photodetectors for producing third and fourth detector signals, respectively;
  means for producing a third log signal having an amplitude which has a logarithmic relationship to an amplitude of said third detector signal;
  means for producing a fourth log signal having an amplitude which has a logarithmic relationship to an amplitude of said fourth detector signal; and
  means for producing said error signal from the difference between the sum of said first and second log signals and the sum of said third and fourth log signals, with said log signals being referenced to an average of said log signals.

9. The apparatus of claim 8 wherein said means for producing said error signal comprises:
  means for summing said first, second, third and fourth log signals to produce a log reference signal;
  first, second, third and fourth means for subtracting said first, second, third and fourth log signals, respectively, from said log reference signal to produce first, second, third and fourth log multiple signals, respectively;
  fifth means for subtracting said first log multiple signal from said second log multiple signal to produce a first log difference signal;
  sixth means for subtracting said third log multiple signal from said fourth log multiple signal to produce a second log difference signal; and
  means for providing said first and second log difference signals to said means for determining the difference.

10. The apparatus of claim 9 wherein said error signal is a tracking error signal and further comprising:
  second means for summing said first and second log difference signals to produce a log sum signal; and
  seventh means for subtracting said log sum signal from zero to produce a focus error signal.

11. The apparatus of claim 9 further comprising a low-pass filter coupled to an output of said first-mentioned means for summing.

12. The apparatus of claim 9 wherein each of said means for subtracting comprises an amplifier.

13. The apparatus of claim 9 wherein each of said means for producing a log signal comprises an amplifier having a diode coupled between an input and an output of said comparator.

14. The apparatus of claim 13 further comprising a second diode in series with said first-mentioned diode.

15. The apparatus of claim 7 further comprising:
  means for detecting a write pulse delivered to said laser and producing a write inhibit pulse when said write pulse is detected; and
  means, responsive to said write inhibit pulse, for preventing said error signal from changing in response to one of said detector signals.

16. The apparatus of claim 15 further comprising peak detection means for eliminating changes in said error signal due to data read pulses in said first and second detector signals, said means for preventing being coupled to said peak detection means to inhibit operation of said peak detection means.

17. The apparatus of claim 7 further comprising:
  means for periodically turning off said laser;
  means for producing an error calibration signal and varying said error calibration signal;
  means for combining an ambient signal from a circuit coupled to an output of one of said photodetectors in the absence of light from said laser with said error calibration signal to produce a combined signal; and
  means for comparing said combined signal with an initialization value for said error signal.

18. The apparatus of claim 17 wherein said means for producing and varying an error calibration signal comprises a controller and a digital-to-analog converter.

19. The apparatus of claim 17 wherein said means for combining comprises an amplifier.

20. The apparatus of claim 7 further comprising peak detection means for eliminating changes in said error signal due to data pulses.

21. The apparatus of claim 30 wherein said peak detection means includes a low pass filter.

22. The apparatus of claim 21 further comprising means for changing the frequency response of said low pass filter.

23. A method for calibrating a detector signal from a photodetector in an optical head responsive to light from a laser reflected off a media, comprising the steps of:
    periodically turning off said laser;
    producing an error calibration signal;
    combining an ambient signal from a circuit coupled to an output of said photodetector in the absence of light from said laser with said error calibration signal to produce a combined signal;
    choosing an initialization value for said error signal;
    comparing said combined signal to said initialization value; and
    varying said error calibration signal until said combined signal reaches said initialization value.

24. The method of claim 23 wherein said error calibration signal is an analog signal and further comprising the steps of:
    producing a digital error calibration signal; and
    converting said digital error calibration signal into analog form to produce said analog error calibration signal.

25. An apparatus for calibrating a detector signal from a photodetector in an optical head responsive to light from a laser reflected off a media comprising:
    means for periodically turning off said laser;
    means for producing an error calibration signal and varying said error calibration signal;
    means for combining an ambient signal from a circuit coupled to an output of said photodetector in the absence of light from said laser with said error calibration signal to produce a combined signal; and
    means for comparing said combined signal with an initialization value for said error signal.

26. The apparatus of claim 25 wherein said means for producing and varying an error calibration signal comprises a controller and a digital-to-analog converter.

27. The apparatus of claim 25 wherein said means for combining comprises an amplifier.

28. A method for determining an error signal from at least first and second detector signals from first and second photodetectors, respectively, in an optical detection system, and applying the error signal as feedback to a focus or tracking actuator in said optical detection system, comprising the steps of:
    (a) producing first and second log signals having amplitudes which have a logarithmic relationship to amplitudes of said first and second detector signals, respectively;
    (b) subtracting one of said log signals from the other of said log signals to produce a logarithmic error signal which is equivalent to the logarithm of the ratio of said first and second detector signals; and
    (c) providing said logarithmic error signal to said focus or tracking actuator in a manner which retains the logarithmic form of said logarithmic error signal.

29. An apparatus for producing a focus or tracking error signal from at least first and second detector signals from first and second photodetectors, respectively, in an optical detection system using a reflected beam from a laser, and applying the error signal as feedback to a focus or tracking actuator in the optical detection system comprising:
    means for producing a first log signal having an amplitude which has a logarithmic relationship to an amplitude of said first detector signal;
    means for producing a second log signal having an amplitude which has a logarithmic relationship to an amplitude of said second detector signal;
    means for determining the difference between said log signals to produce a logarithmic error signal which is equivalent to the logarithm of the ratio of said first and second detector signals; and
    means for providing said logarithmic error signal to said focus or tracing actuator in a manner which retains the logarithmic form of the logarithmic error signal.

* * * * *

UNITED STATES PATENT AND TRADEMARK OFFICE
CERTIFICATE OF CORRECTION

PATENT NO. : 4,998,234

DATED : March 5, 1991

INVENTOR(S) : Theodore Rees et al.

It is certified that error appears in the above-identified patent and that said Letters Patent is hereby corrected as shown below:

Col. 13, line 1, delete "claim 30", insert --claim 20--.

Signed and Sealed this

Fourteenth Day of July, 1992

Attest:

DOUGLAS B. COMER

Attesting Officer  Acting Commissioner of Patents and Trademarks